United States Patent

[11] 3,599,676

| [72] | Inventor | John C. Fisher<br>Toronto, Ontario, Canada |
|---|---|---|
| [21] | Appl. No. | 746,021 |
| [22] | Filed | July 19, 1968 |
| [45] | Patented | Aug. 17, 1971 |
| [73] | Assignee | George Angus (Canada) Limited<br>Toronto, Ontario, Canada |

[54] FIREHOSE
13 Claims, 10 Drawing Figs.

[52] U.S. Cl. ................................................ 138/109
[51] Int. Cl. ................................................ F16l 57/00
[50] Field of Search ........................................... 138/109, 96, 110, 123; 18/1, 16, 34, 36; 29/422, 425, 428, 505

[56] References Cited
UNITED STATES PATENTS

| 180,790 | 8/1876 | Reed | 138/123 X |
|---|---|---|---|
| 1,249,038 | 12/1917 | Dabney | 138/110 |
| 2,700,988 | 2/1955 | Smisko | 138/110 X |
| 3,416,531 | 12/1968 | Edwards | 138/123 X |

*Primary Examiner*—Louis K. Rimrodt
*Attorney*—Stevens, Davis, Miller and Mosher

ABSTRACT: To enable a hose to be fitted to a coupling of smaller diameter, the terminal end portion of the hose is supported internally and pressure is applied circumferentially around the terminal end portion.

FIREHOSE

The present invention relates to increasing fluid flow and/or pressure in firehoses while maintaining or without changing standard couplings now used to join hoses end to end. The increased flow and/or pressure is provided by using an improved firehose having one diameter throughout its length and terminal ends of a reduced diameter. The invention further relates to a method and apparatus for reducing the diameter of the terminal ends of the hose.

Firehose presently used generally consists of a fabric material in tubular form which may be either lined or unlined. Lined firehoses presently on the market fall into two categories; one which has a thick lining generally consisting of black rubber having a minimum thickness of 0.049 inches, and one which has a thin lining wherein the thickness is less than 0.040 inches. Linings of the latter type may be made of various materials and can even be as thin as a few thousandths of an inch. In some cases, there may be a lining that is not impervious thus providing a lined type of hose with controlled percolation. The present invention concerns generally thin-lined hoses and unlined hoses. This, however, is not an exclusive limitation because in certain instances, the method to be discussed hereinafter may be also applicable to thick lined hoses.

In the case where the hose is unlined, it has an extremely high frictional resistance, because of the rough interior, retarding the flow of fluid. The friction loss in lined hose is much less than in an unlined hose because of the smooth interior. In the case of both unlined and lined, it is desirable to have the minimum friction loss possible. Metal couplings such as brass, aluminum or the like are utilized to interconnect lengths of hoses end-to-end; however, the surface of the coupling is short and relatively smooth and does not materially resist flow as compared to the fabric hose which may be in lengths of up to 100 feet or even more. Flow and/or pressure of fluid, accordingly, can be increased substantially by increasing the diameter of the hose without an associated modification to the internal diameter of the coupling. For standardization purposes, as for example in a specific field of use such as forestry, it is preferable that all couplings be of the same size. However, under present practice it is not possible to use one size of coupling for various diameters of hoses.

It is a primary object of the present invention to increase flow and/or pressure of fluid in firehoses without modifying or changing commonly used couplings.

A further object of the present invention is to provide means whereby terminal end portions of a lined or unlined firehose having a diameter larger than normally could be used with a coupling member, may be reduced in diameter such that they may be used with the coupling without modification to the latter. The step of reducing the diameter is effected after the hose has been constructed and thus the increase in flow and/or pressure is accomplished without modification to existing equipment used in the manufacture of hoses.

In one aspect of the present invention there is provided a method of increasing flow and/or pressure in a series of fabric hoses connected end-to-end by coupling members, said method comprising using lengths of hoses larger than normally otherwise would be possible without an associate change in size of couplings and reducing the diameter of the ends of said hoses to be inserted into the couplings for connecting the same end-to-end by supporting the internal surface of said hose at the terminal end portion; applying pressure circumferentially around said hose along the length of the terminal end portion to be reduced in diameter while continuing to support the inner surface thereof; removing said inner support; and, removing the pressure applied to the outer surface.

In a further aspect there is provided a method of decreasing the diameter of a terminal end portion of a fabric hose comprising: (a) supporting the internal surface of said hose at said terminal end portion; (b) applying pressure circumferentially around said hose along the length of the terminal end portion to be reduced in diameter while continuing to support the inner surface thereof; (c) removing said inner support; and, (d) removing the pressure applied to the outer surface.

A still further object of the present invention is to provide a method of reducing the diameter of a firehose, along a portion of the length thereof.

The invention is illustrated by way of example in the accompanying drawings wherein.

Figure 1:
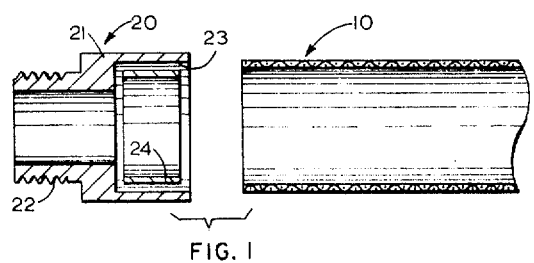
FIG. 1 is a horizontal section of a portion of hose and the male portion of a coupling adapted to be secured to one end thereof.
Figure 3:
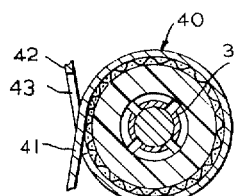
FIG. 3 is a view along section 3–3 of FIG. 2.

Referring to FIG. 1, shown therein is a portion of a length of hose 10 having a common outside diameter of 1-11/16 inches. Illustrated is a woven fabric, unlined hose. It may, however, be lined if desired. Also, the fabric need not be woven but may take any form desired providing there is sufficient strength to withstand operating pressures. The present invention is not concerned with actual hose construction. A metal coupling member 20 is adapted to be secured to a terminal end of the hose. The coupling member 20 consists of a portion 21 having male threads 22 whereby it may be detachably secured to the female portion of a coupling member attached to an opposite end of an adjacent hose. The coupling member 20 has an internal bore 23 at the opposite end which is substantially the same diameter as the outside diameter of the hose. In order to secure the coupling member to the hose, the hose is inserted into the bore 23 and, thereafter, a brass expansion ring 24 is expanded mechanically frictionally to grasp the hose between the inner surface of the bore 23 and the outer surface of the brass expansion ring 24. The assembled hose is of common construction.

In accordance with the present invention, the same coupling member 20 is utilized but in conjunction with a hose having an outside diameter greater than 1-11/16 inches throughout the major portion of its length. In order to insert the larger diameter hose into the bore 23, it is necessary to reduce the outside diameter to approximately 1-11/16 inches.

In accordance with a further feature of the present invention, a mandrel assembly 30 is inserted into the hose end to be reduced in diameter and a split metal band 40 is placed around the outside of the hose. The mandrel assembly includes a resilient portion which is compressed by constriction of the metal band.

Figure 2:
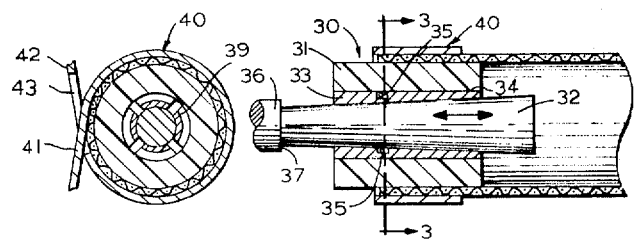
FIG. 2 is a longitudinal section of apparatus, in accordance with the present invention, for reducing the diameter of the terminal end portion of hose.

The core assembly 30 consists of a rubber sleeve 31, a tapered mandrel 32 and a segmental friction reducing member or bearing 33. The resilient sleeve 31 is preferably rubber; however, other materials also may be used. A rubber sleeve having a hardness of 38 Shore is found to produce satisfactory results. The sleeve has an axial bore 34. The bearing fits into the bore 34 and consists of a series of segments which may be held together by an annular spring 35 fitting into a groove 39 on the outer surface of each segment or alternatively the arrangement may be such that frictional engagement of sleeve on the segments may retain the latter in position. The inner surface of each segment is tapered to complement the tapered outer surface of the mandrel 32. Movement of the mandrel to the left, as viewed in FIG. 2, causes the resilient sleeve to expand while movement of the mandrel to the right permits the sleeve to return to its original shape. The mandrel 32 may be provided with an enlarged end portion 36 providing an annular abutment or ledge 37. This ledge may be of such diameter as to engage an end of the segments thus preventing separation of the mandrel and segments during normal use.

The initial outside diameter of the sleeve 31 is slightly smaller than the final inside diameter of the reduced end portion of the hose. This permits the mandrel assembly to be removed from the hose after it has been reduced in diameter. The purpose of the resilient sleeve 31 is to support the hose while it is being reduced in diameter to prevent creases and folds. The sleeve 31 is initially increased in diameter by suitable directional movement of the tapered mandrel 32. The sleeve is increased in diameter such that the outer surface contacts the internal surface of the hose. The sleeve thus provides support for the hose during a subsequent constricting operation effected by the clamp 40 thus preventing creases and folds in the hose during such constricting operation. The resiliency of the rubber sleeve is such that hand pressure need only be applied to the mandrel to effect expansion. A stiffer or softer rubber can be used if desired and should leverage be required on the tapered mandrel, it could be readily provided by suitable wedges engaging the ledge 37 and the adjacent end of the bearing segments. Alternatively the enlarged end 36 may be replaced by a nut threaded onto the tapered mandrel 32 and a sleeve may be clampingly engaged between the nut and the adjacent end of the bearing segments. It is obvious that by appropriate rotation of the nut, the tapered mandrel may be moved to effect expansion of the resilient sleeve 31.

Figure 7:
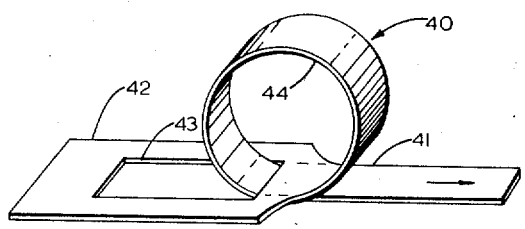
FIG. 7 is an oblique view of a clamp for use in reducing the hose diameter.

The metal band 40 is shown in detail in FIG. 7 and consists of a relatively narrow band portion 41 terminating at one end in a wider portion 42. The narrow end 41 passes through an aperture 43 to form a variable diameter loop 44. The loop engages the outer surface of the firehose and suitable forces may be applied to the band to clampingly engage the hose between the band and the resilient sleeve. The free end of the band portion 42 may be anchored to a jig fixed with respect to a member for applying force to the opposite or relatively narrow end 41 of the band.

The metal band while being constricted exerts substantially an even force all around the outside of the hose and during this constriction of the band, the core reduces in diameter while fully supporting the hose to prevent the latter from collapsing, i.e., the hose retains its circular shape without creases or folds. The split metal band which constricts the hose is reduced to have an inside diameter less than the eventual required outside diameter of the compressed end of the hose. The hose being somewhat resilient and having a memory tends to return partially to its original position. The hose thus would tend to increase in diameter slightly after removal of the rubber core and the split metal band.

During constriction of the hose and resilient sleeve, it is readily apparent that the resilient material must be displaced from its normal position. The resilient member which is constricted along with the hose, bulges out at opposite ends and also into the spaces between the segments of the bearing member 33. The number and spacing of the bearing segments may be selected to provide suitable characteristics.

Figure 4:
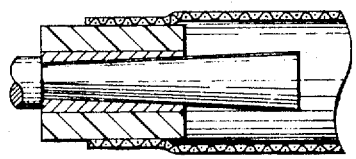
FIG. 4 is a longitudinal sectional view similar to FIG. 2 but showing the relative position parts requisite for removing the apparatus from the hose.

After the hose and resilient sleeve have been constricted, the tapered mandrel 32 is moved in a direction to release the internal force on the resilient sleeve thereby permitting it to return to its original shape. As previously mentioned, the outside diameter of the released resilient sleeve is substantially equal to the final internal diameter of the hose. FIG. 4 illustrates the mandrel in such a position. The constricting band is then removed followed by removal of the mandrel assembly.

In actual practice, it has been found that the hose must be constricted to have an outside diameter of 1-19/32 inches in order to be certain that the final compressed outside diameter after removal of the clamping forces is approximately 1-11/16 inches for insertion into the same size aperture in a coupling. The reduced end portion of the hose illustrated in FIG. 4 may be readily inserted into the bore 23 of the coupling member. The procedure of compressing the end preferably is effected just prior to insertion of the hose into the bore of the coupling member since fabric has a certain amount of memory. The memory tends to partially return the hose to its original diameter and thus will not stay in the original completely compressed state for an indefinite period of time.

No material is mechanically or otherwise removed from the hose end when it is reduced in size. There are the same number (and strength) of warp ends (if woven) in the circumference. There are the same number (and strength) of weft yarns (if woven) per inch of length. If the hose has a lining (of whatever material), the same volume of material will still exist if it were a substantially solid-type lining. If a porous type lining is used, it is possible that the volume would be slightly reduced.

The constricting operation compresses or compacts the existing warp and weft yarns into a denser structure. This is possible due to the fact that a woven (if woven) firehose fabric is not manufactured to form a solid, i.e. there are spaces between adjacent yarns. Additionally, the individual yarns are not to be considered as a solid yarn, i.e. they are generally twisted from many fibers, and hence have minute spaces between fibers.

The constricting operation may compress the lining into a denser structure if it happens to be a porous-type of lining. Alternatively, a more solid-type of lining (such as rubber or latex) may have its shape slightly changed by being compressed, in that some of the lining will be displaced (temporarily) up into the intersticies between the fabric yarns.

The wall thickness of the hose may remain the same as the compressive forces of the metal constricting band may compensate for the increase in density of the material, and the inherent desire of the material to want to become thicker as the compressing action takes place. Alternatively, depending on the construction of individual hoses, it is possible that the wall thickness of the hose could become either slightly thicker or slightly thinner than it was originally. This possible change in wall thickness is not important as long as the internal diameter of the constricted portion of the hose is large enough to accept the brass expansion ring 24.

It is unlikely that the length of the hose under the metal constricting band will lengthen, due to the frictional force between this metal band and the rubber core. However, if it did lengthen as a result of the constricting operation, it would have absolutely no effect on the operation of the hose, or the attachment of the metal couplings.

In the foregoing specification, an example has been given for the exact dimension in reducing the diameter of the hose. It is to be understood that these dimensions are for illustrative purposes only. The essential point to be noted is the difference in diameters of the before and after treatment, this being far too large to permit squeezing the hose into the coupling without mechanically compressing the end to decrease its diameter. It is possible to squeeze a hose into a coupling wherein the coupling is slightly smaller than the hose, i.e. where the diameter differential in such case is not too great.

The present invention is concerned with decreasing the hose diameter to fit into a coupling wherein there is a significant difference initially in the respective diameters, in fact, so significant that the hose cannot be put into the coupling other than after mechanically reducing the diameter of the hose.

The permanency of the reduced diameter at the terminal ends is dependent upon several factors which include (a) type of hose, i.e. lined or unlined, (b) material used for the lining and the material used for the outer covering, (c) the degree or amount of reduction, and (d) the compressive forces used to reduce the diameter.

A feature common to these is the resiliency of the hose and in general it thus may be said that the permanency of the reduction in diameter is dependent upon the hose memory, i.e. its ability to return wholly or partially to its original shape and size. An unlined hose, for example, does have a memory, and will partially return towards its original size. It will, however, retain enough of its original constriction, to be able to be inserted into couplings up to several hours after the constricting operation. A lined hose, on the other hand, because of the lining, expands enough in a relatively short period of time (approximately 15 minutes after constriction), that one cannot insert the hose successfully into the coupling. Unlined hoses thus may be reduced in diameter at one time and at a later time have the couplings assembled thereon while on the other hand lined hoses will normally have to be reduced at the time the couplings are being assembled onto the hose.

Figure 6:
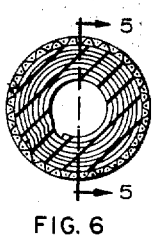
FIG. 6 is an end view of the hose and mandrel shown in FIG. 5.
Figure 5:
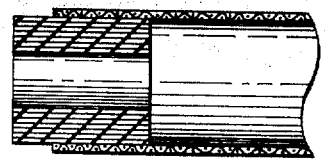
FIG. 5 is similar to FIG. 2 illustrating a modified mandrel insertable into the end of the hose to be reduced in diameter.

It is obvious that various alternatives may be used to effect the above method of compressing or decreasing the end portion of a hose. For example, the mandrel assembly illustrated in FIG. 2 may be modified by eliminating the segmental bearing member 33. In such a modified form, the tapered mandrel would directly contact the internal surface of the resilient sleeve. It is obvious, however, that such a device has certain limitations, for example, frictional engagement of the mandrel on the resilient material. This, to a certain extent, could be overcome by suitable lubricants which, in most cases, have a relatively short life. As a further alternative, the resilient sleeve may consist of a resilient strip of material would into a spiral. The spirally-wound ribbon may be expanded by rotating the inner end in a counterclockwise direction as viewed in FIG. 6 and subsequent to the constricting operation, it may be readily removed by rotating the same end in an opposite direction. As a further alternative, the metal constricting band illustrated in FIG. 7 may be replaced by an ordinary hose clamp-type of arrangement having a threaded screw or lever arrangement for reducing its diameter and providing the necessary force to constrict the hose and resilient sleeve.

While the foregoing illustrates a rather simple procedure, it represents a major improvement in that greater flow and/or pressure of water is attained while maintaining the standardization of hose couplings in a specific filed of use, such as for example in forestry. Furthermore, additional flow and/or pressure is provided without increasing the coupling weight as would normally be required through the addition of larger or heavier couplings to connect the hose.

In the foregoing description, there is disclosed a method of increasing flow and/or pressure with specific preferred use of firehoses in forests, and some advantages of the invention are noted as follows:

a. A larger diameter hose can be used than would normally be the case with a standard hose coupling, thus reducing frictional loss. The hose, for example, may have 1-13/16 inches diameter as opposed to a normal 1-11/16 inches outside diameter resulting in a frictional loss decrease of something in the order of 33 percent.

b. Standard forestry couplings may be used which would otherwise require the use of a smaller hose than is the case when utilizing the present invention. This eliminates the necessity of large couplings which would otherwise be associated or required with the larger hose and the larger couplings obviously would be much heavier and more expensive.

c. The constricting operation can be readily and quickly performed at any location in the filed or shop.

Figure 8:
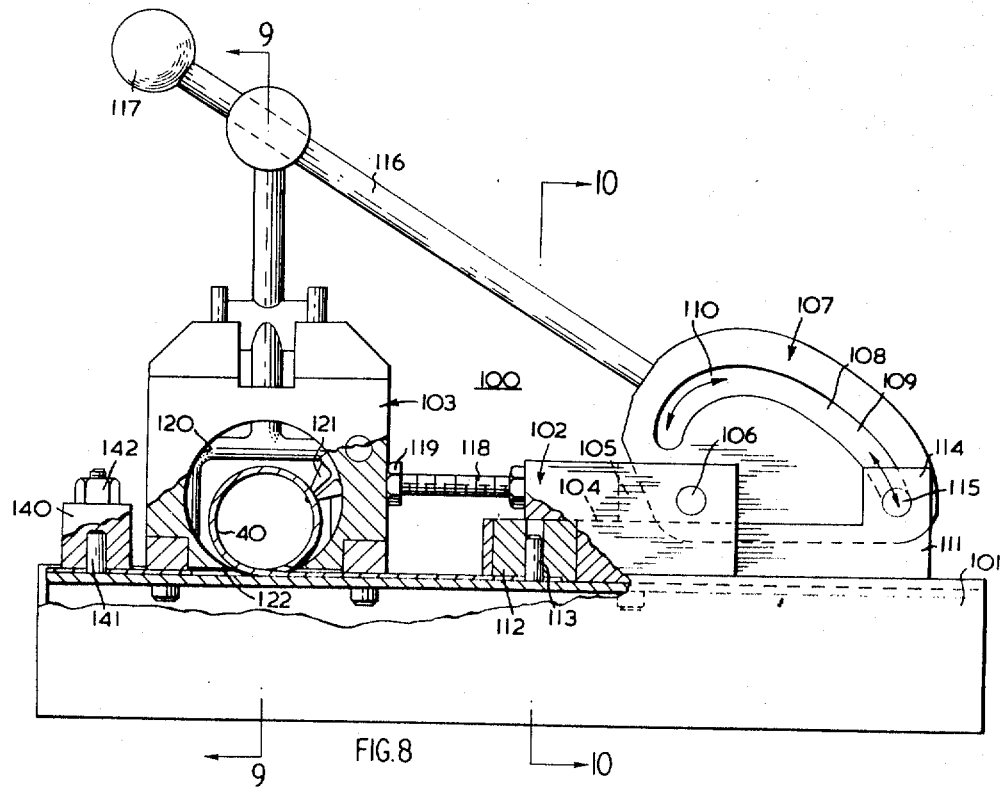
FIG. 8 is a partial sectional side elevational view of a machine or apparatus suitable for use in constricting the end of a hose in accordance with the present invention.
Figure 9:
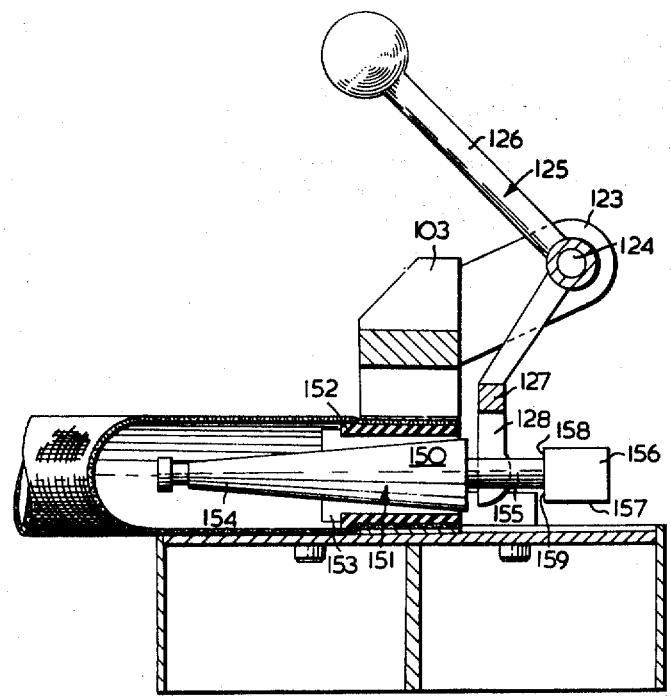
FIG. 9 is a sectional view along section 9–9 of FIG. 8.
Figure 10:
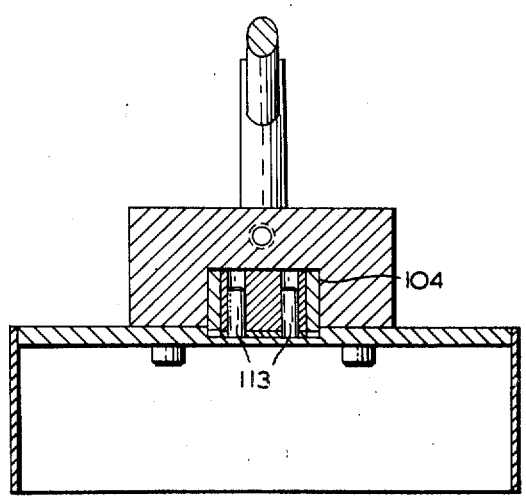
FIG. 10 is a cross-sectional view along section 10–10 of FIG. 8.

Illustrated in FIGS. 8 to 10 inclusive is an apparatus which may be used to constrict the hose and shown therein is a hose constricting machine 100 consisting of a base 101 having a pair of blocks 102 and 103 secured thereto in spaced relationship. The machine further includes a constricting strap 40 which is preferably of metal with means for anchoring one end of the strap to the base and further means securing the other end of the strap to a movable member. The fixed block 102 may be bolted, or otherwise secured to the base and includes a channel 104 adjacent the upper surface of the base. The block has a further cutout portion indicated generally by the reference numeral 105 which, in effect, provides a pair of lugs or ears, each of which is apertured to receive a pin 106.

A member 107 is pivotally secured to the block 102 by pin 106. The member 107 includes a cam 108 consisting of an elongated slot having a relatively flat curved portion 109 extending from one end and terminating at the other end in a relatively sharp curved portion 110.

Located in the channel 104 is a slide block 111 comprising a generally rectangular elongated body apertured at one end to receive a pair of pins 113 and terminating at the other end in a pair of lugs 114. The lugs are apertured to receive a pin 115 having the longitudinal axis thereof disposed normal to the direction of sliding movement of the member or block 111. The pin 115 projects through the slot 108 and provides a cam follower slidable along the cam slot. The member 107 further includes a handle 116 rigidly secured such that a knob 117 at the free end thereof may be readily grasped by the hand to effect pivotal movement of the cam 108 and about the pivot pin 106.

The body member 103 is secured to the base at a position spaced with respect to the body 102 and, likewise, may be bolted, or otherwise secured, rigidly, to the base. To provide suitable adjustment, a strut 118, consisting of a threaded bolt, is positioned intermediate the two body members, 102 and 103, with opposite ends thereof in abutting relationship therewith. The bolt may be threaded (i.e., opposite threads at opposed ends of the bolt) into suitable apertures in the respective body members at opposite ends of the bolt and locked in position by a pair of locknuts 119. Alternatively, the head of a threaded bolt may be disposed in abutting relation against member 103 with the other end thereof threaded into member 102 and locked in position by a locknut 119. The spaced relationship of body members 102 and 103 may be varied by rotation of the bolt and such adjustment provides means of maintaining the body members 102 and 103 in selected spaced relationship.

The body 103 has an aperture 120 extending at least partially therethrough and the longitudinal axis of such aperture is perpendicular to the direction of sliding movement of the slide member 111. Projecting into the aperture 120 from a sidewall thereof is a stop or abutment 121, the purpose of which will become more apparent hereinafter. The lower edge of the body 103 is slotted along a selected portion of its width, the slot extending in the same direction as the longitudinal sliding movement of the slide 111. This slot is indicated generally by the reference numeral 122 and, as will be noted in FIG. 8, it intersects the aperture 120.

The body 103 has a pair of lugs 123 projecting outwardly therefrom and such lugs are apertured to receive a pin 124 pivotally to mount thereon an extractor 125. The extractor 125 consists of a rigid body having a handle portion 126 at one end and a mandrel gripping portion 127 at the opposite end. The mandrel gripping portion 127 is positioned adjacent a side face of the block 103 to overlie the aperture 120 and the pivotal mounting is such that the extractor end moves in a direction toward and away from the aperture 120. The purpose of this movement will become apparent hereinafter. As seen in FIG. 9, the extractor end portion 127 terminates in a downwardly projecting lug 128, only one being required; however, in the preferred form, a pair of such lugs is provided with the lugs being disposed in selected spaced relationship.

The constricting machine further includes the previously mentioned metal constricting band 40, one end of which is anchored to the movable slide block 111 and the other end anchored to the base of the machine. The under surface of the slide block 111 is undercut by an amount corresponding to the thickness of the band and the metal band is apertured to receive a pair of pins 113 located in apertures in the slide block and which project into the block undercut portion. The pins 113 may be located in the block proper or, alternatively, a circular in cross section insert 112, as illustrated in FIG. 8.

The insert is rotatable in the block and facilitates alignment of the pins 113 with the apertures in the band. The opposite end of the constricting band 40 is anchored to the base 101 by a clamp 140. The clamp has an undercut portion, the depth of which corresponds to the thickness of the band and a further pair of apertures project inwardly from the undercut to receive a pair of pins 141.

The block 140 is secured to the base by a bolt 142 with the pins 141 projecting downwardly to bear against the top surface of the base. The pins project into respective ones of a pair of apertures in the band 40 thereby rigidly anchoring such end of the metal band to the base.

It is obvious from the foregoing that in operation, reciprocation of the handle 116 about the pivot pin 106 effects pivotal movement of the member 107 whereby the pin 115 in the slide block moves along the cam slot 108. Movement of the slide block 111 is relatively slow when the pin 115 is in the flatly curved portion 109 of the cam slot and the movement of the slide is relatively faster when the pin slides in the sharply curved cam slot portion 110.

As previously mentioned, one end of the metal strap 40 is connected to the slide block 111 and it is thus obvious that oscillation of the handle 116 effect sliding movement of the block 111 alternately to decrease and increase the internal diameter of the metal band 40. Further operation of the machine will be described after the following description of the mandrel illustrated in FIG. 9.

Referring to FIG. 9, there is shown a mandrel assembly 150 which consists of a mandrel body 151 inserted into an aperture of a resilient sleeve 152. There is also included a bearing between the mandrel 150 and the inner surface of the sleeve 152, and as illustrated in FIG. 9, such bearing consisting of a plurality of segmental wedges 153. The mandrel 151 as a tapered end body portion 154 with a stem 155 projecting therefrom, the latter of which terminates in a flattened end portion 156. The flattened end portion has a pair of opposed sides which preferably are spaced apart the same distance as the diameter or size of the shaft 155 and a further pair of faces indicated by the reference numeral 157 normal to the previously mentioned faces. The faces 157 are located outwardly beyond the stem 155 providing ledges 158 and 159. The segmental wedges 153 have an inner surface tapered, the taper of which corresponds to the taper of the mandrel portion 154.

In operation, the mandrel assembly 150 is inserted into the end of the firehose to be constricted and the mandrel 151 is pushed by hand into the hose to expand the sleeve 152 such that the outer surface thereof engages the inner surface of the hose. The hose with the mandrel inserted is then inserted into the aperture 120 of the constricting machine until the end of the hose bears against the abutment or stop member 121. In order to insert the mandrel and hose into the aperture, it is necessary to orientate the mandrel flattened end portion 156 to a position such that it will pass between the lugs or ears 128 of the extractor. When in position, the hose and mandrel assembly, or alternatively, just the mandrel, is rotated through a selected angle (approximately 90°) whereby ledges 158 and 159 may be engaged by engaging the extractor lugs 128 upon pivotal movement of the extractor about its pivot pin 124. In order to effect such engagement, it is necessary that the faces 157 be spaced apart a greater distance than the spacing between the lugs 128.

In order to constrict the end of the hose, the handle 116 is rotated in a counterclockwise direction, as viewed in FIG. 8, thus decreasing the internal diameter of the metal constricting band 40. The handle 126 of the extractor is then pivoted by hand in a counterclockwise direction, as viewed in FIG. 9, to release the pressure on the resilient sleeve 152 in order that the hose will not be expanded when the constricting force is released. The handle 116 is then rotated in a clockwise direction as viewed in FIG. 8 to increase the internal diameter of the metal band 40 and thereafter, the hose may be removed from the machine.

The mandrel assembly provided includes a resilient member engageable with the hose and the purpose of the same is to fully support the hose portion to be constricted during the constricting operation and thus prevent collapse of the hose and the formation of wrinkles. In the event wrinkles should occur, they may be readily smoothed out by finger pressure or the like and, if necessary, the foregoing procedure may be repeated.

As previously mentioned, the mandrel assembly 150 may be removed from the hose before the hose is taken out of the constricting band. This, of course, necessitates arranging the extractor such that the mandrel assembly can be removed without interference from the extractor portion 127. Alternatively, the mandrel assembly may remain in the hose in its released position and removed from the hose after the latter has been taken out of the constricting machine's aperture 120.

It will be observed from the foregoing that the mandrel 32 (FIG. 2) is moved in a direction out of the hose to expand the sleeve 31 whereas the mandrel 151 (FIG. 9) is moved into the hose. The direction of movement and arrangement may be varied as desired, the required result being controlled variation of the outer diameter of the mandrel assembly. In function, the resilient sleeve of the mandrel assembly engages the inner surface of the hose during constriction of the same and after constriction of the hose, the assembly is removed from pressural engagement of the sleeve with the hose prior to release of the constricting force. This function is accomplished by controlled expansion and contraction of the sleeve.

I claim:

1. A fabric tubular length of hose having a substantially uniform diameter throughout its length comprising:
   a. an initial outside diameter throughout a major portion of its length;
   b. an end portion having a reduced outside diameter which is less than that of said initial diameter, the outer walls of both the initial diameter portion and the reduced diameter portion being substantially parallel to the longitudinal axis of the hose.

2. The method of decreasing the diameter of a terminal end portion of a fabric hose comprising:
   a. supporting the internal surface of said hose at said terminal end portion;
   b. applying pressure circumferentially around said hose along the length of the terminal end portion to be reduced in diameter while continuing to support the inner surface thereof;
   c. removing said inner support; and
   d. removing the pressure applied to the outer surface.

3. A method as defined in claim 2 wherein the wall thickness of the hose of said terminal end portion remains substantially the same.

4. The method of decreasing the diameter of a terminal end portion of a fabric hose comprising:
   a. inserting a compressible core into said end portion, said core having an initial diameter substantially equal to the internal diameter of said hose thereby providing a snug fit;
   b. applying pressure circumferentially around said hose along the length of the terminal end portion to be reduced in diameter;
   c. removing the core; and,
   d. removing the pressure applied to said hose terminal end portion.

5. The method of connecting a coupling member to the end of a firehose having a fabric outer covering of greater diameter than a recess in the coupling member into which said hose is to be inserted comprising, clampingly engaging and applying pressure to the wall of the end of said hose to compress the wall to an outside diameter equal to or less than that of said recess, inserting said reduced end into said recess and inserting an annular member into said hose to exert an outward force clampingly to engage the reduced end between the internal circumferential wall surface of the recess and the external circumferential wall surface of the annular chamber.

6. The method of decreasing the frictional flow losses through firehose having a fabric outer covering and hose coupling members at opposed ends thereof without modifying standard coupling members of the type having a recess therein to receive an end portion of the hose clampingly engaged therewith by an annular sleeve enlarged after insertion thereinto comprising providing a hose having a diameter larger than said recess without an associated increase in wall thickness, reducing the diameter of the ends of said hose to that of the recess in the coupling by compacting the fabric whereby the wall thickness at the coupling is not increased, the resistance to flow thereby remaining the same at the couplings and being decreased intermediate the ends due to the increase in diameter of the hose.

7. A method of increasing flow and/or pressure in a series of fabric hoses connected end-to-end by coupling members, said method comprising using a hose larger than normally otherwise would be possible without an associate change in size of couplings and reducing the diameter of the ends of said hoses to be inserted into the couplings by supporting the internal surface of said hose at said terminal end portion; applying pressure circumferentially around said hose along the length of the terminal end portion to be reduced in diameter while continuing to support the inner surface thereof; removing said inner support; and removing the pressure applied to the outer surface.

8. A machine for use in constricting a tubular hose comprising:
   a. a rigid base member;
   b. a member having an aperture expandible and contractable respectively to a diameter greater and less than the original outside diameter of said hose;
   c. a mandrel assembly insertable into said hose and being expandible and contractable whereby the mandrel may be inserted into the hose and then expanded firmly to engage the inner surface of such hose and subsequently contracted for removing the mandrel from said hose; and
   d. means for expanding and contracting the aperture of said mandrel and means separate from said last-mentioned means for expanding and contracting said mandrel assembly.

9. A machine as defined in claim 8 wherein said expandible and contractable member comprises a band of material looped and having a pair of opposed end portions, one end of which is secured to said base and the other end to a member movably mounted on said base.

10. A machine as defined in claim 8 wherein said mandrel assembly comprises an outer resilient sleeve member having a tapered mandrel body portion insertable thereinto to expand and contract the resilient member and thereby respectively increase and decrease the outer diameter of the resilient sleeve.

11. A machine for use in a constricting tubular hose comprising:
   a. a rigid base member;
   b. a first block assembly rigidly secured thereto and having an aperture to receive at least an end portion of said hose;
   c. a second block member rigidly secured to said base;
   d. a slide member retained in position by the latter mentioned block for guiding said block along a selected path;
   e. a looped band member having the loop thereof in the aperture of said first mentioned block and having one end rigidly anchored to said base and the other end anchored to said movable slide thereby providing means for varying the diameter of the loop in said band; and
   f. linkage means connected to said base and said slide block for reciprocating said slide block along a selected path.

12. A machine as defined in claim 11 wherein said linkage means comprises a block assembly having a cam engageable with a cam follower on said slide.

13. A machine as defined in claim 12 wherein said cam has a surface providing varying speed of movement of the slide assembly, the cam surface being such that the block has a relatively initial fast speed in constricting the diameter of the band and subsequently, a relatively slower speed thereafter.